UNITED STATES PATENT OFFICE.

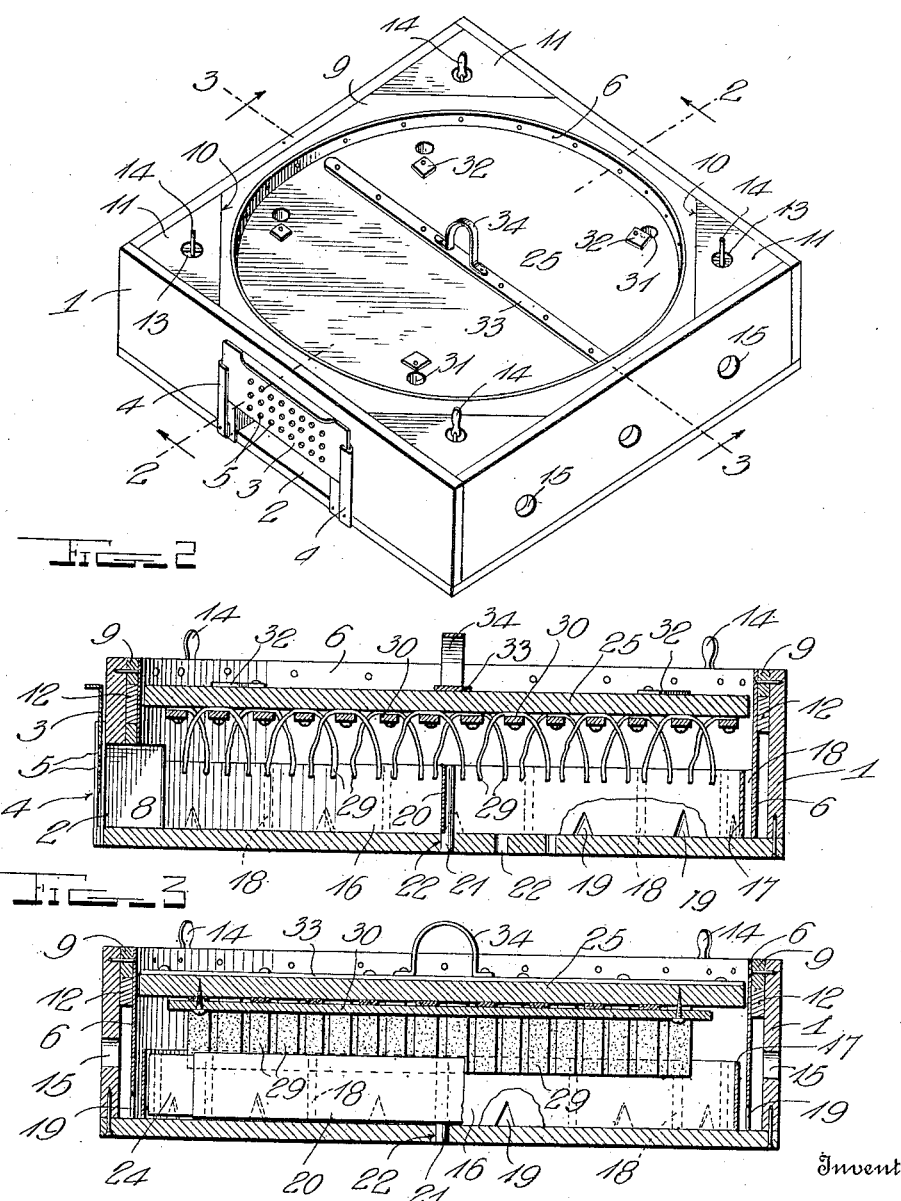

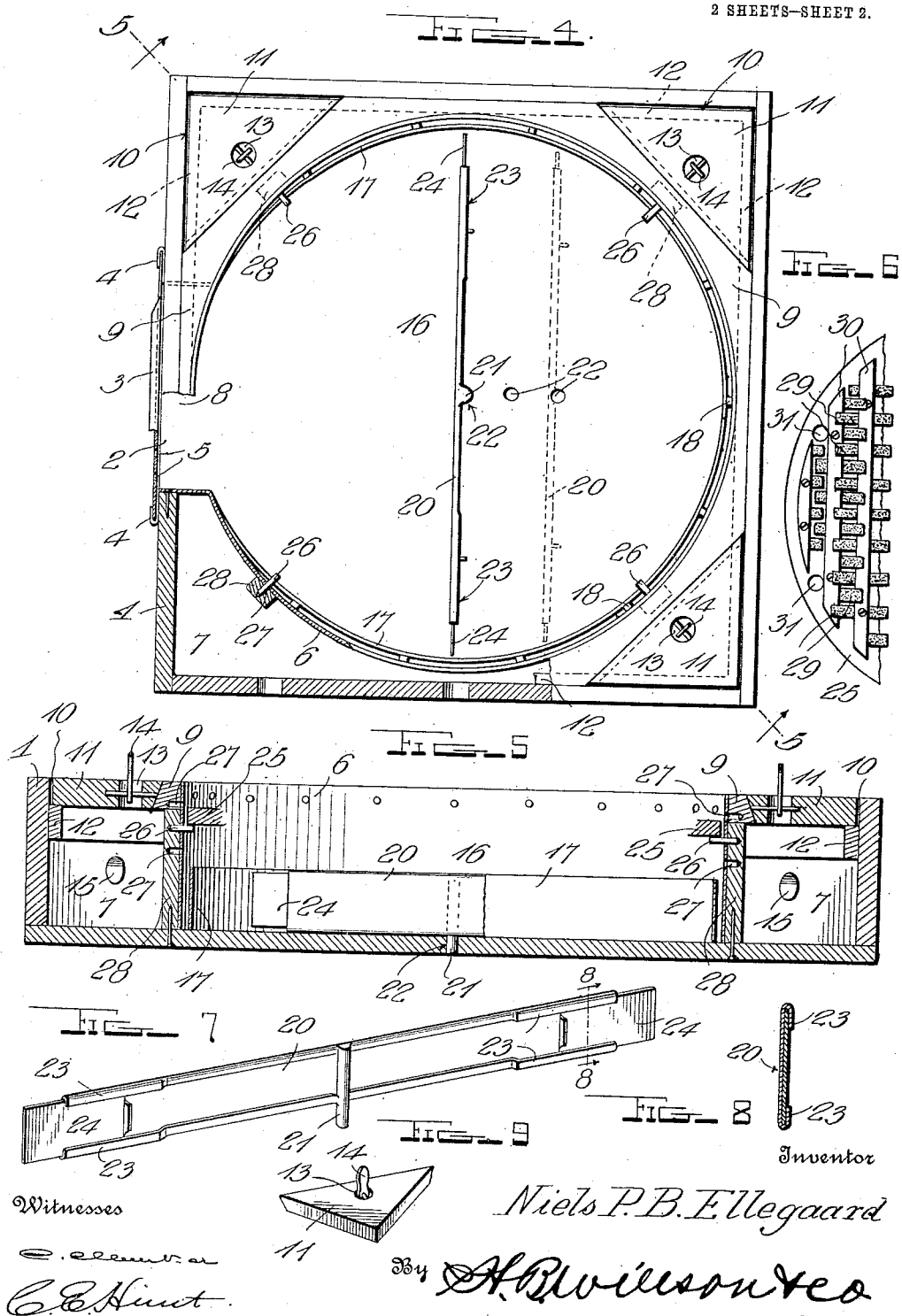

NIELS PETER BRODERSEN ELLEGAARD, OF PETALUMA, CALIFORNIA.

FIRELESS BROODER.

1,082,116. Specification of Letters Patent. Patented Dec. 23, 1913.

Application filed January 13, 1913. Serial No. 741,821.

*To all whom it may concern:*

Be it known that I, NIELS PETER BRODERSEN ELLEGAARD, a subject of the King of Denmark, residing at Petaluma, in the county of Sonoma and State of California, have invented certain new and useful Improvements in Fireless Brooders; and I do declare the following to be a full, clear, and exact description of the invention, such as will enable others skilled in the art to which it appertains to make and use the same.

This invention relates to improvements in fireless brooders.

One object of the invention is to provide a brooder of this character having an improved construction and arrangement of compartments to receive the chicks and compartments to contain a heating medium whereby a uniform heat will be maintained in the brooder for a considerable length of time and will be discharged into the chick compartment above or over the chicks, thus supplying the heat in a natural manner as the same would be supplied were the chicks brooded by a hen.

Another object is to provide a brooder having an adjustable top or hover adapted to be raised and lowered and supported at different elevations in the chick compartment of the brooder and having an adjustable means for preventing the chicks from crowding one another.

With these and other objects in view, the invention consists of certain novel features of construction, and the combination and arrangement of parts as will be more fully described and claimed.

In the accompanying drawings: Figure 1 is a perspective view of my improved brooder; Fig. 2 is a vertical cross sectional view taken on the line 2—2 of Fig. 1; Fig. 3 is a similar view taken at right angles to Fig. 2 and on the line 3—3 of Fig. 1; Fig. 4 is a plan view of the brooder with the top or hover removed, and parts broken away and in section. Fig. 5 is a vertical sectional view taken diagonally through the brooder on the line 5—5 of Fig. 4; Fig. 6 is a detail bottom plan view of a portion of the hover or top of the chick compartment of the brooder; Fig. 7 is a detail perspective view of the adjustable partition for the chick compartment; Fig. 8 is a cross sectional view of the partition taken on the line 8—8 of Fig. 7; Fig. 9 is a detail perspective view of one of the removable cover pieces for the compartment which contains the heating medium of the brooder.

My improved brooder comprises an outer casing 1 which may be of any suitable size and shape and is here shown as being square or rectangular, and in one side of which is formed a door opening 2 adapted to be closed by a vertically moving door 3 which is slidably supported in suitable guides 4 secured to the outer side of the casing. The door is provided with a series of ventilating openings or perforations 5 through which air is supplied to the chicks as will be hereinafter more fully described. In the casing 1 is arranged a circular partition 6 between which and the inner sides and corners of the casing is formed a space 7 adapted to receive hot sand or other heating medium whereby the brooder is heated. The ends of the partition 6 opposite the door opening 2 in the side of the casing are bent radially to form a passage 8 leading to the central compartment of the brooder within the partition 6 and in which the chicks are received.

The space 7 between the partition 6 and the sides of the casing is closed by a top or upper wall 9 and in each corner of said top 9 is formed a triangular opening 10 through which the sand or other heating medium is supplied to the space 7. The openings 10 are closed by triangularly shaped cover pieces 11 which are supported on cleats 12 secured to the inner sides of the casing. In each of the cover pieces 11 is a ventilating opening 13 in which is secured a tab 14 by means of which the cover piece may be readily removed and replaced in the openings 10. In the sides of the casing at a suitable distance above the bottom thereof are formed ventilating openings 15 which permit some of the heat to escape from the space 7.

Arranged within the central space or chick compartment 16 adjacent to and spaced a suitable distance from the inner side of the circular partition 6 is a circular guard and heat deflecting plate 17 which extends upwardly to substantially half the height of the brooder and is spaced a slight distance from the partition 6 by spacing strips 18 as clearly shown in Fig. 4 of the drawings. In the lower portion of the partition 6 are formed series of triangularly shaped heat passages 19 through which the heat from the material placed in the compartment or space 7 passes upwardly between the partition and the guard plate 17 and is discharged into the upper portion of the compartment 16 over the chicks thus supplying the heat to the latter in a natural manner or in the same manner in which the heat would be supplied by a hen in covering the chicks. The space or compartment 16 is preferably divided into two compartments by a transversely disposed partition 20 which is pivotally and adjustably supported in the compartment by a centrally disposed stud 21 which is adapted to be engaged with a series of vertical sockets 22 formed in the bottom of the casing as shown in Fig. 4 of the drawings. The main portion of the partition 20 is considerably shorter than the diameter of the compartment 16 and on the upper and lower edges of the ends of the partition are formed guide flanges 23 with which are slidably engaged plates 24 adapted to be shifted inwardly and outwardly in the flanges 23 to regulate the length of the partition according to the position in which the same is adjusted in the compartment 16 as clearly illustrated in full and dotted lines in Fig. 4 of the drawings. By providing the partition 20 as herein shown and described the chick compartment may be divided into two spaces to prevent the chicks from crowding and injuring each other.

Arranged in the upper portion of the chick compartment of the brooder is a circular cover or top 25 which is adjustably supported in said compartment by pins 26 which are engaged with vertical series of pin holes 27 formed in the partition 6 and in posts 28 which are secured to the bottom of the casing and which serve as braces for the partition 6 and as supports for the top 9 of the space 7. Secured to the inner side of the top or cover 25 are series of felt strips 29 which depend or hang down in the chick compartment and together with the top 25 form a hover for the chicks. The felt strips 29 may be secured to the inner side of the top 25 in any suitable manner but are preferably secured thereto by a series of transverse cleats 30 which are fastened to the inner side of the cover by screws whereby said cleats and the felt hover strips may be quickly and easily removed to permit the strips to be cleaned or renovated. In the top 25 are formed a series of ventilating openings 31 each of which is provided with a pivoted cover plate 32 which is adapted to be swung over the upper ends of the openings to a greater or less extent thereby regulating the size of the same and controlling the ventilation of the chick compartment. Secured to the upper side of the cover or top 25 is a transverse cleat or cross bar 33 to which is secured a centrally disposed handle 34 whereby the top or cover may be readily removed when desired.

By providing a series of felt hover strips as herein shown and described the heated air discharged over the heat deflecting plate 17 will circulate through or between the depending ends of the hover strips and will thus be evenly distributed to all of the chicks beneath said strips.

While I have herein shown and described the space 7 between the partition 6 and the sides of the casing as being provided to receive sand or other heating medium this space may also be employed for containing a volatile disinfectant or insecticide, the fumes of which will be discharged into the chick compartment in the same manner in which the heat passes thereto. By placing the disinfectant or insecticide in the space 7 the chicks cannot reach the same which will permit the use of effective poisons which cannot be otherwise employed for disinfecting the brooder or keeping the chicks free from vermin.

From the foregoing description taken in connection with the accompanying drawings, the construction and operation of the invention will be readily understood without requiring a more extended explanation Various changes in the form, proportion and the minor details of construction may be resorted to without departing from the principle or sacrificing any of the advantages of the invention as claimed.

Having thus described my invention, what I claim is:

1. A brooder comprising a square casing having an opening in one side wall closed by a removable door, a circular partition within said casing having its ends bent radially outward to the sides of said door opening, an annular top plate closing the casing outside said partition and having triangular openings at its corners, cleats in the sides of the casing adjacent these openings, triangular cover pieces removably fitting in said openings and resting on said cleats and having ventilating openings through their bodies, a tab fastened in each opening and extending above the cover plate for the purpose set forth, said partition being provided with heat passages near its lower edge and with upright series of holes, pins adjustably mounted in the latter, and a cover plate resting on said pins.

2. A brooder comprising a square casing having an opening in one side wall closed by a removable door, a circular partition within said casing having its ends bent radially outward to the sides of said door-opening, an annular top plate closing the casing outside said partition and having openings at its corners, cover pieces removably fitting said openings, said partition being provided with heat openings in its lower edge, upright posts rising from the bottom of the casing around said partition, the latter and the posts being pierced with an upright series of holes, pins adjustably seated in the holes, a round cover supported by said pins and carrying the hover elements on its under side, a handle on its upper side, and means for deflecting upward the heat flowing inward through said circular partition.

3. In a brooder of the class described, the combination with a square casing, a circular partition therein producing a central chick compartment and a surrounding space adapted to receive a heating medium, the lower edge of said partition being provided with heat passages, a top plate for said surrounding space, and means for gaining access to the latter; of a circular deflector plate resting on the bottom of the casing within said partition and extending only partway of the height of the latter but beyond said passages, spacing strips between said deflector and partition, and a round cover plate covering the latter and closing the chick space.

4. In a brooder having a round chick space, the combination with the casing whose bottom is provided with a series of sockets, one at the center of said space and others along a radius thereof, the wall of said space having a door opening opposite said series of sockets; of a cross partition having an upright stud depending from its center and adapted to engage any of said sockets, guide flanges on its edges at its ends, extension plates movably mounted in said flanges for the purpose described, a round cover fitting movably within the wall of said chick space, and means for supporting said cover at different elevations above the cross partition.

In testimony whereof I have hereunto set my hand in presence of two subscribing witnesses.

NIELS PETER BRODERSEN ELLEGAARD.

Witnesses:
HANS HANSEN,
JULIUS FRITZ.

---

Copies of this patent may be obtained for five cents each, by addressing the "Commissioner of Patents. Washington, D. C."